United States Patent [19]

Schwartz

[11] 4,437,628
[45] Mar. 20, 1984

[54] POSITION AND RESTRAINT SYSTEM FOR AIRCREWMAN

[75] Inventor: Marcus Schwartz, Warminster, Pa.

[73] Assignee: The United States of America as represented by the Secretary of the Navy, Washington, D.C.

[21] Appl. No.: 53,465

[22] Filed: Jun. 29, 1979

[51] Int. Cl.³ .................... B64D 25/02; B64D 25/06
[52] U.S. Cl. ................... 244/122 AG; 244/122 B; 244/122 AE; 280/733; 297/465
[58] Field of Search .......... 244/122 R, 122 A, 122 B, 244/122 AB, 122 AC, 122 AD, 122 AE, 122 AF, 122 AG, 122 AH, 141; 280/729, 733, 743, 753; 297/465, 466, 216; 2/2, DIG. 3; 9/341, 342

[56] References Cited

U.S. PATENT DOCUMENTS 3,077,324  2/1963  Strickland ................... 244/122 B Primary Examiner—Trygve M. Blix
Assistant Examiner—Rodney Corl
Attorney, Agent, or Firm—R. S. Sciascia; Henry Hansen

[57] ABSTRACT

An aircraft ejection seat position and restraint system for protecting an aircrewman against back injuries during emergency escape. The ejection sequence is initiated by the aircrewman pulling a lower ejection handle or a face curtain handle with both hands to release or shatter the cockpit canopy. A torso harness suit is concommittantly tightened with inflation of a vest worn between the aircrewman and the suit, and catapult rockets are fired to propel the seat out of the cockpit. The harness suit draws the aircrewman's upper torso against the back of the seat while the inflated vest pushes his hips back and down into the seat pan for optimally positioning his spine before ejection thereby negating the effects of an aircrewman purposely or inadvertently flying with a loose harness. After ejection, the seat is separated from the aircrewman but the vest remains inflated inside the harness providing cushioning against the opening shock force of the parachute which is attached to the harness suit. The inflatable vest is formed as a separate, one-piece garment which may be removed between flights.

3 Claims, 7 Drawing Figures

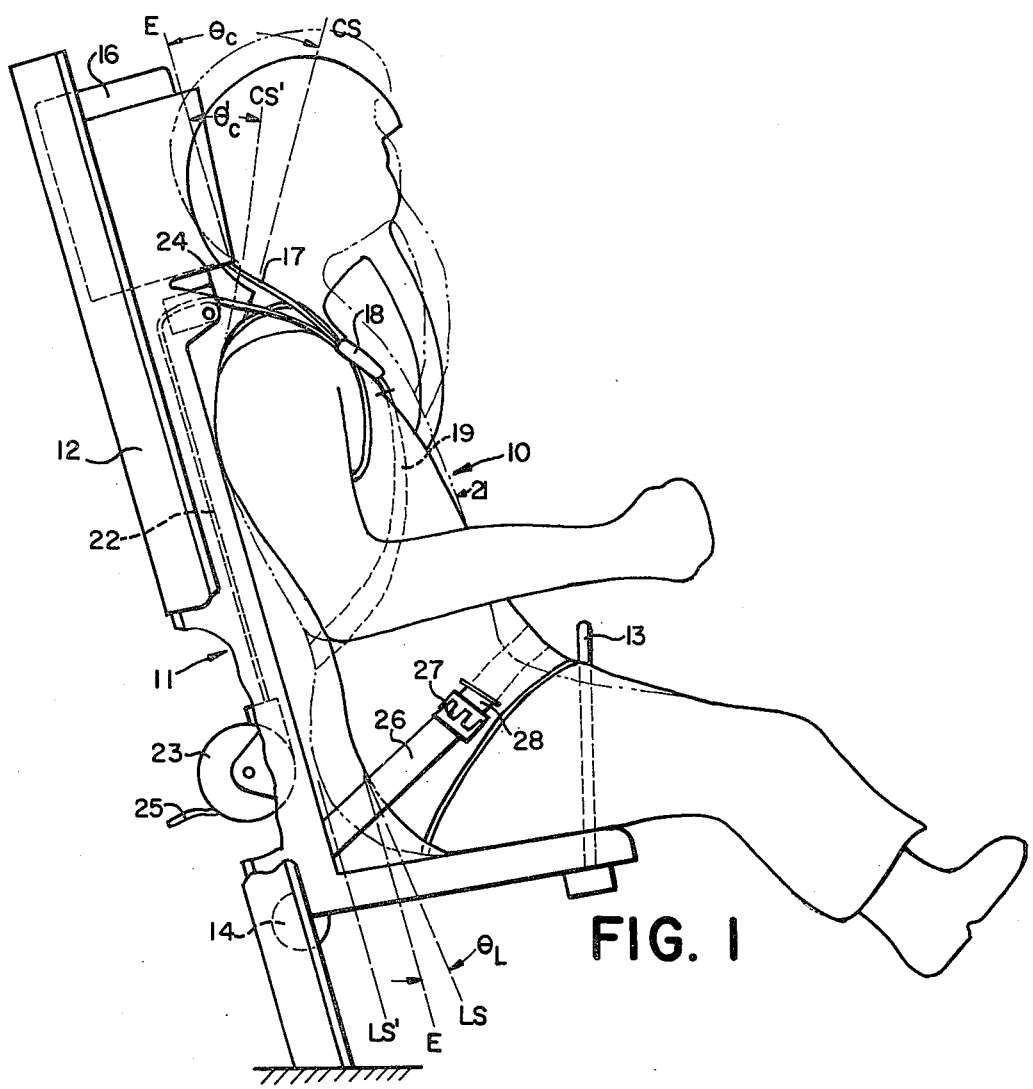
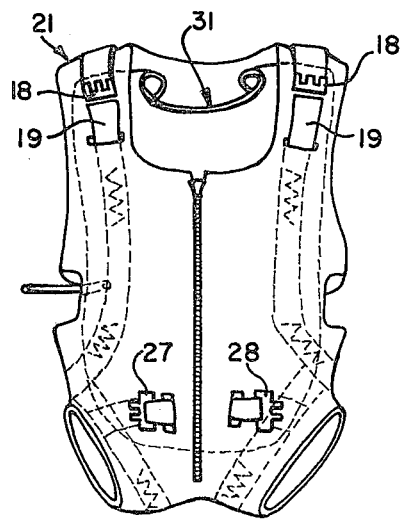
FIG. 2
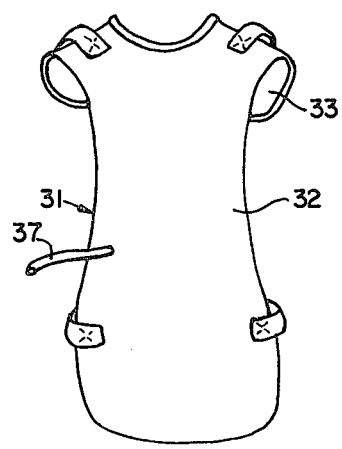
FIG. 3
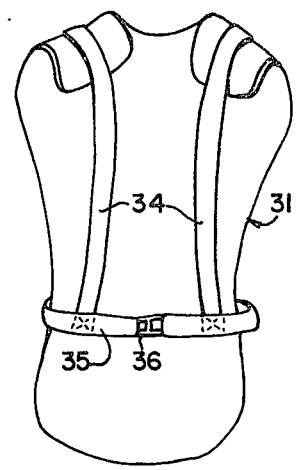
FIG. 4

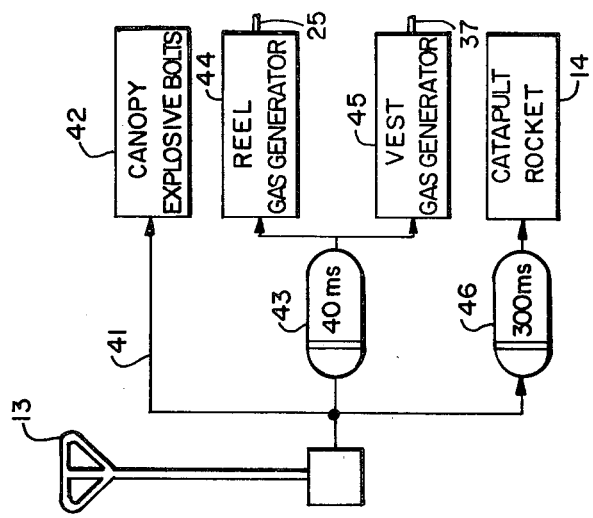
FIG. 5
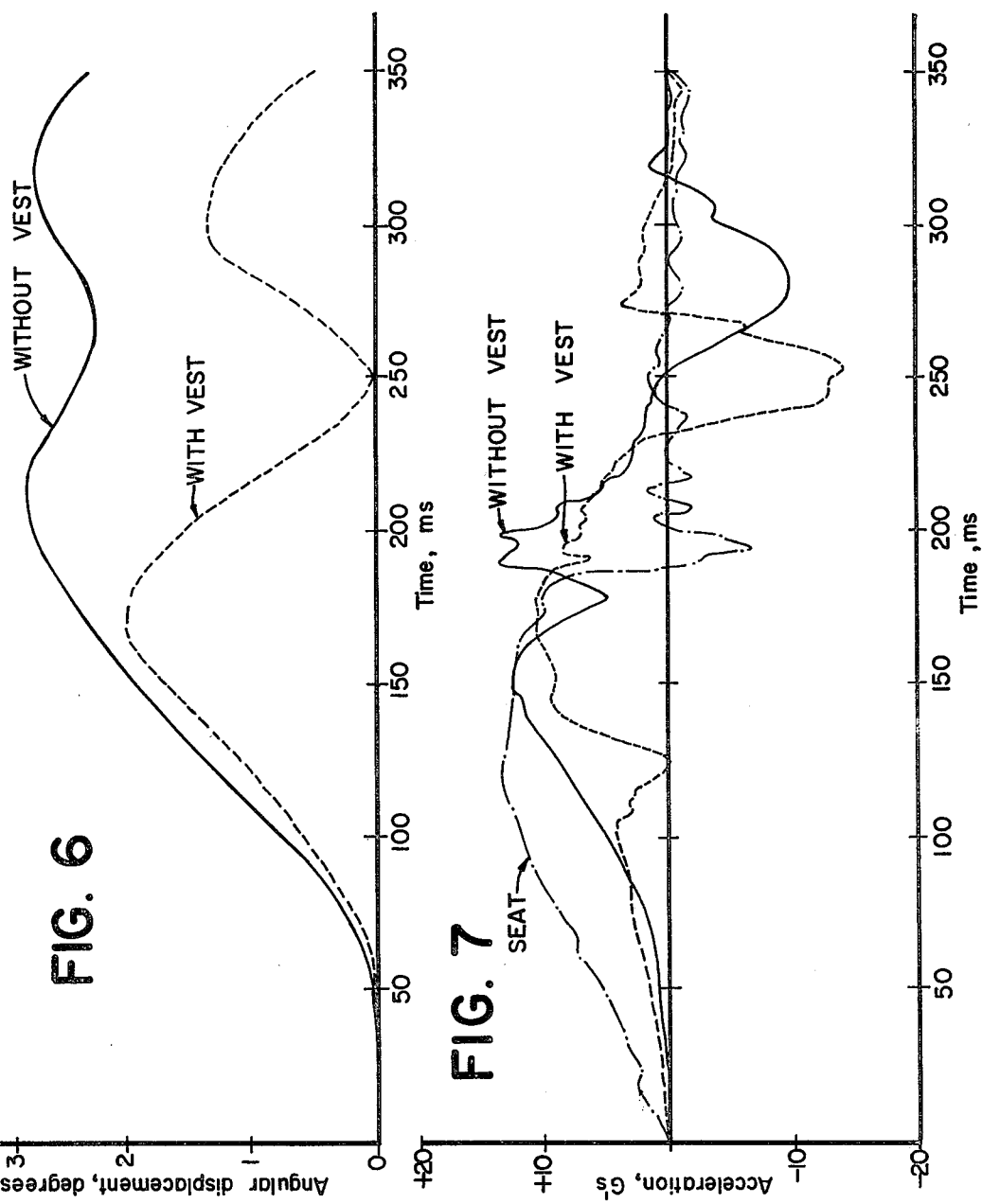
FIG. 6
FIG. 7

POSITION AND RESTRAINT SYSTEM FOR AIRCREWMAN

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to restraint systems for aircraft ejection seats, and more particularly to a restraint system which optimally and securely positions an aircrewman in an aircraft ejection seat prior to emergency escape from the cockpit.

High performance military aircraft are usually equipped with a catapult ejection seat which utilizes rocket thrust to propel it from the aircraft for emergency in-flight escape of aircrewman. A torso harness suit worn by the aircrewman over his flight coveralls serves both as a restraint system and a parachute harness. Typically, the harness suit includes a lap belt releasably connected to the lower seat portion, and shoulder straps attachable to an inertia reel mechanism fixed to the seat which permits free body movement during normal flight but automatically locks between 2 and 3 G's deceleration to prevent further forward movement. The inertial reel mechanism also includes a gas-actuated motor which forcibly draws the aircrewman's shoulders against the back of the seat prior to emergency ejection, the purpose being to insure that his spine is along the direction of acceleration of the seat.

Documented evidence has shown that injuries ranging from minor to severe still occur during or after egress due to improper restraint. See for example Report No. AMRL-TR-77-60, October 1977, entitled "F/FB-111 Escape Injury Mechanism Assessment" by Leon E. Kazarian, Aerospace Medical Research Laboratory, Aerospace Medical Division, Air Force Systems Command, Wright Patterson Air Force Base. Many of these injuries are attributable to an improperly fitted or loosely worn torso harness suit. A loosely worn harness suit causes the aircrewman to slide forward and under the lap belt and tilt his head forward. Under a high ejection force, this posture is highly susceptible to acute hyperflexion in the lumbar and cervical regions of the spine. Improper fit of the harness suit also diminishes effectiveness of the inertia reel retraction during positioning, induces flailing of the arms and legs in the windstream, and imposes additional shock loads on the aircrewman during parachute opening.

SUMMARY OF THE INVENTION

It is therefor an object of the present invention to provide an improved position and restraint system which forcibly places the aircrewman in optimal body alignment prior to ejection to minimize injuries to the aircrewman, and which automatically compensates for a poorly fitted or improperly adjusted harness suit. Another object is to provide a novel system which reduces force amplification during ejection and parachute opening shock and the tendency to induce flailing of the aircrewman's limbs. Still another object is to provide a restraint system which increases the bearing surface over which the ejection forces and parachute loads are applied to the aircrewman, which is readily adaptable to present ejection seats and harnesses, which can be easily removed between flights, and which compensates for poorly fitted or loosely secured harnesses. A still further object of the invention is to provide an effective restraint system during adverse flight conditions such as buffetting and high turbulence. These and other objects of the invention are achieved as described herein.

Briefly, an inflatable bladder formed in a vest configuration is worn during flight between the aircrewman's flight coveralls and a torso harness suit of the type including a lap belt releasably connected to the seat and shoulder straps releasably and retractably connected to the seat and parachute risers. The vest is concommittantly inflated with retraction of the shoulder straps before the seat and aircrewman are catapulted from the cockpit. The vest remains inflated after the seat is separated from the aircrewman to provide a cushioning effect against the opening shock forces imparted by the parachute.

Other objects, advantages and novel features of the invention will become apparent from the following detailed description of the invention when considered in conjunction with the accompanying drawings.

BRIEF DESCRIPTION OF THE DRAWINGS

FIG. 1 is a schematic representation of a typical aircraft ejection seat including a position and restraint system according to the invention;

FIG. 2 represents a front view of an inflatable vest within a torso harness suit as applied to the restraint system of FIG. 1;

FIG. 3 represents a front view of the inflatable vest of FIG. 2 with the torso harness suit removed;

FIG. 4 is a rear view of the inflatable vest of FIG. 3;

FIG. 5 is a schematic block diagram of the control system for the position and restraint system of FIG. 1; and FIGS. 6 and 7 are graphs of typical performance characteristics experienced by the aircrewman with and without the position and restraint system of FIG. 1.

DESCRIPTION OF THE PREFERRED EMBODIMENT

Referring now to FIG. 1, an aircrewman is shown in solid outline in a position and restraint system 10 according to the invention secured to an ejection seat 11 in a typical inflight posture. For reasons of comfort during long flight periods rather than for the contingency of emergency ejection, the aircrewman prefers slack restraint which allows his hips to be forward of the back rest. This causes his head to be tilted forward of his shoulders. Consequently, the aircrewman's spinal column particularly in the lumbar and cervical regions are angularly displaced forward of the direction of the ejection force. This is illustrated by the angle $\theta_L$ subtended by the line of ejection E and the line LS tangent to the curvature of the lumbar spine at the hips, and the angle $\theta_C$ subtended by the ejection line E and the line CS tangent to the curvature of the cervical spine at the shoulders. Vertical acceleration of the torso when in such a posture results in acute hyperflexion in the lumbar and cervical regions by movement of the upper torso down into the seat behind the pelvis and forward rotation of the head about the shoulders. Under these conditions, injuries of the spine such as anterior wedge compression fractures and torn or ruptured interspinous ligaments are not uncommon. To minimize hyperflexion during ejection, the aircrewman's optimal position should be as shown in broken outline in FIG. 1. That is, the line LS' tangent to the lumbar spine and ejection line E are substantially parallel, and the angular displacement of the cervical spine along the line CS' has been significantly reduced to the angle $\theta'_c$. As experimental tests have shown, placement of the aircrewman in the latter position prior to ejection reduces the G-force component transverse to the spine together with a significant reduction in hyperflexion.

The ejection seat 11 is slidably mounted on catapult guide rails 12 fixed to the aircraft. A lower ejection handle 13 attached to the seat pan between the aircrewman's legs or face curtain ejection handles (not shown) fire ejection seat catapult cartridges 14 which provide the thrust required for ejection. Handle 13 or the face curtain handles remain attached to the seat during ejection allowing him to retain his grip and prevent arm flailing when exposed to the wind blast. The seat headrest houses a personnel parachute pack 16 having two parachute risers 17 extending from the pack and respectively connected through quick-release fasteners 18 to shoulder straps 19 of a torso harness suit 21.

Shoulder straps 19 are also connected through retractable restraint straps 22 to a gas pressure operated inertia reel 23 fixed to seat 11 which permit the aircrewman to move freely fore and aft under normal flight but automatically lock under high-G conditions to prevent untoward forward motion. As described herein, pulling the ejection handle 13 or the face curtain handles, actuates a gas generator producing a pressure at conduit 25 which overrides normal operation and causes the inertial reel 23 to retract restraint straps 22 and forcibly pull the aircrewman shoulders against the seat 11 in anticipation of ejection. A cartridge-activated guillotine 24 severs the restraint straps 22 automatically after ejection, or manually for manual separation or emergency ground egress. The aircrewman is also secured at the lower torso by seat lap belts 26 through two quick-release fasteners 27 to either end of a harness suit lap belt 28. The seat lap belts 26 are automatically releasable during man-seat separation by means not shown.

The restraint system 10 further includes a separate inflatable vest 31 having a front bib portion 32 and shoulder portions 33 generally conforming to and worn beneath the front and shoulder portions of the harness suit 21. Shoulder straps 34 and waist belt 35 securing the vest on the aircrewman are connected by a manually releasable fastener 36. Flexible tube 37 conducts compressed gas to the vest.

To the extent pertinent to the present invention, FIG. 5 schematically illustrates an ejection control system. The control system may include other components, not shown, relating to post ejection operation but they do not form a part of the present invention. The lower ejection handle 13, or the face curtain handles (not shown), provides a signal through direct circuit 41 to cockpit canopy explosive bolts 42, through a time delay circuit 43 to a reel gas generator 44 and an inflatable vest gas generator 45, and through time delay circuit 46 to catapult rocket 14. The delay time in circuit 43 (approximately 40 milliseconds) is sufficient to allow the canopy to be completely removed from the cockpit prior to ejection. The reel and vest gas generators 44 and 45 operate concommittantly since the vest 21 will be operationally inflated before restraint straps 22 are fully retracted by inertia reel 23.

The ejection sequence as applied to the position and restraint system of the present invention is summarized as follows. The sequence is initiated by pulling the lower ejection handle 13, or the face curtain, which immediately fires explosive bolts 43 jettisonning the cockpit canopy. Following a 40 millisecond delay by circuit 43, reel and vest gas generators 44 and 45 produce gas pressure to override inertia reel 23 and to inflate vest 21 thereby forcing the upper and lower torso of the aircrewman against the back of the ejection seat 11. His spinal column is thereby positioned as near as possible along the direction of seat ejection. Approximately 300 milliseconds after pulling handle 13, the catapult rocket 14 is fired exerting the required ejection force. Following ejection, controls, not shown, operate guillotine 24 and seat lap belts 26 to separate the aircrewman from the seat and to initiate additional operating modes such as emergency oxygen system, life raft deployment, etc.

FIGS. 6 and 7 graphically demonstrate the significant improvements attributable to the present invention in aircrewman protection against back injury. FIG. 6 is indicative of angular displacement of the cervical region of spine during ejection with and without the vest 31. The average peak horizontal acceleration of the aircrewman's head under these displacements were 66.44 G's and 88.18 G's, or a 25% reduction. FIG. 7 is the horizontal component of acceleration of the torso with and without the vest 31 and is indicative of a 26% reduction in horizontal hyperflexion force imparted on the spinal column.

Some of the many advantages and novel features of the invention should now be apparent. For example, a system is provided which positions and restrains the aircrewman in the optimal position during seat ejection for protection against back injuries. The system compensates for improperly fitted or poorly adjusted torso harness suits. During seat-man separation, the seat is disconnected and falls away while the vest still inflated within the torso harness suit provides a cushioning effect between the parachute and the aircrewman against excessive opening shock forces that a parachute exerts. The inflated vest may also serve as a flotation device either augmenting or replacing the life preserver usually worn by the aircrewman. As a separate garment, the vest may be easily removed between flights and simplifies manufacture because it obviates modification of existing flight suit coveralls and harness suits for inflatable protection devices.

Obviously, many modifications and variations of the present invention are possible in light of the above teachings. Therefore to be understood that within the scope of the appended claims, the invention may be practiced otherwise than as specifically described.

What is claimed is:

1. A system for positioning and restraining an aircrewman in an aircraft ejection seat catapulted by a thrust motor comprising, in combination:

a torso harness suit including lap belt means formed to be releasably connected at one end to the seat, and shoulder strap means;

retracting means formed to be secured to the seat including restraint strap means releasably connected at the outer ends to said shoulder strap means;

inflatable vest means formed to be worn by the aircrewman and positioned beneath the front and shoulder portions of said suit adjacent to said lap belt means and said shoulder strap means for forcing upper and lower torso of the aircrewman against the back of the seat; and control means operable by the aircrewman for emergency escape including first actuator means connected to said retracting means for concomittantly retracting said restraint strap means and inflating said vest means, and second actuator means formed to be connected to the thrust motor for initiating ejection a predetermine time after operation of said first actuating means; whereby the aircrewman's spinal column is positioned as near as possible along the direction of seat ejection.

2. A system according to claim 1 wherein:
said retracting means includes an inertia reel for permitting free fore and aft movement under normal flight and for retracting said restraint strap means in response to said control means.

3. A system according to claim 2 wherein:
said vest means includes an inflatable bib and shoulder portions coextensive with the front and shoulders of said suit, and gas generating means initiated by said first actuator for producing gas pressure within said portions.

* * * * *